US007861670B2

(12) United States Patent
Berns

(10) Patent No.: US 7,861,670 B2
(45) Date of Patent: Jan. 4, 2011

(54) BIRD FEEDER

(76) Inventor: Joseph F. Berns, 3451 Sherbrook Dr., Cincinnati, OH (US) 45241

(*) Notice: Subject to any disclaimer, the term of this patent is extended or adjusted under 35 U.S.C. 154(b) by 829 days.

(21) Appl. No.: 11/748,713

(22) Filed: May 15, 2007

(65) Prior Publication Data

US 2007/0266951 A1 Nov. 22, 2007

Related U.S. Application Data

(60) Provisional application No. 60/747,713, filed on May 19, 2006.

(51) Int. Cl.
*A01K 39/01* (2006.01)

(52) U.S. Cl. .......... 119/52.3; 119/57.9; 119/61.3; 119/429

(58) Field of Classification Search ............ 119/52.3, 119/57.8, 57.9, 61.3, 429
See application file for complete search history.

(56) References Cited

U.S. PATENT DOCUMENTS

| | | |
|---|---|---|
| D194,109 S | 11/1962 | Dilley |
| 3,211,130 A | 10/1965 | Prince |
| 3,301,217 A | 1/1967 | Prowinsky |
| 3,927,645 A | 12/1975 | Varner |
| 4,331,104 A | 5/1982 | Clarke |
| 4,434,745 A * | 3/1984 | Perkins et al. .......... 119/57.9 |
| 5,111,772 A * | 5/1992 | Lipton .................. 119/57.9 |
| D351,262 S * | 10/1994 | Fasino .................. D30/127 |
| 5,699,752 A | 12/1997 | Wilkins |
| 5,826,541 A | 10/1998 | Wilkins |
| 6,024,047 A | 2/2000 | Hoogland |
| 6,543,384 B2 * | 4/2003 | Cote ..................... 119/57.9 |
| 6,758,164 B2 * | 7/2004 | Rich ..................... 119/52.3 |
| 7,237,507 B1 * | 7/2007 | Colwell ................ 119/51.01 |
| 7,353,774 B2 * | 4/2008 | Bradeen ................ 119/57.9 |
| 2006/0207512 A1 * | 9/2006 | Fort, II ................. 119/57.8 |

* cited by examiner

*Primary Examiner*—Yvonne R. Abbott
(74) *Attorney, Agent, or Firm*—Wood, Herron & Evans, L.L.P.

(57) ABSTRACT

A bird feeder including an enclosure, heat shield and clinging element especially suited for clinging birds. A suspension element allows the bird feeder to hang from an overhead structure and supports a basket within the enclosure. The basket contains bird feed suspended under the protection of the enclosure and heat shield.

14 Claims, 8 Drawing Sheets

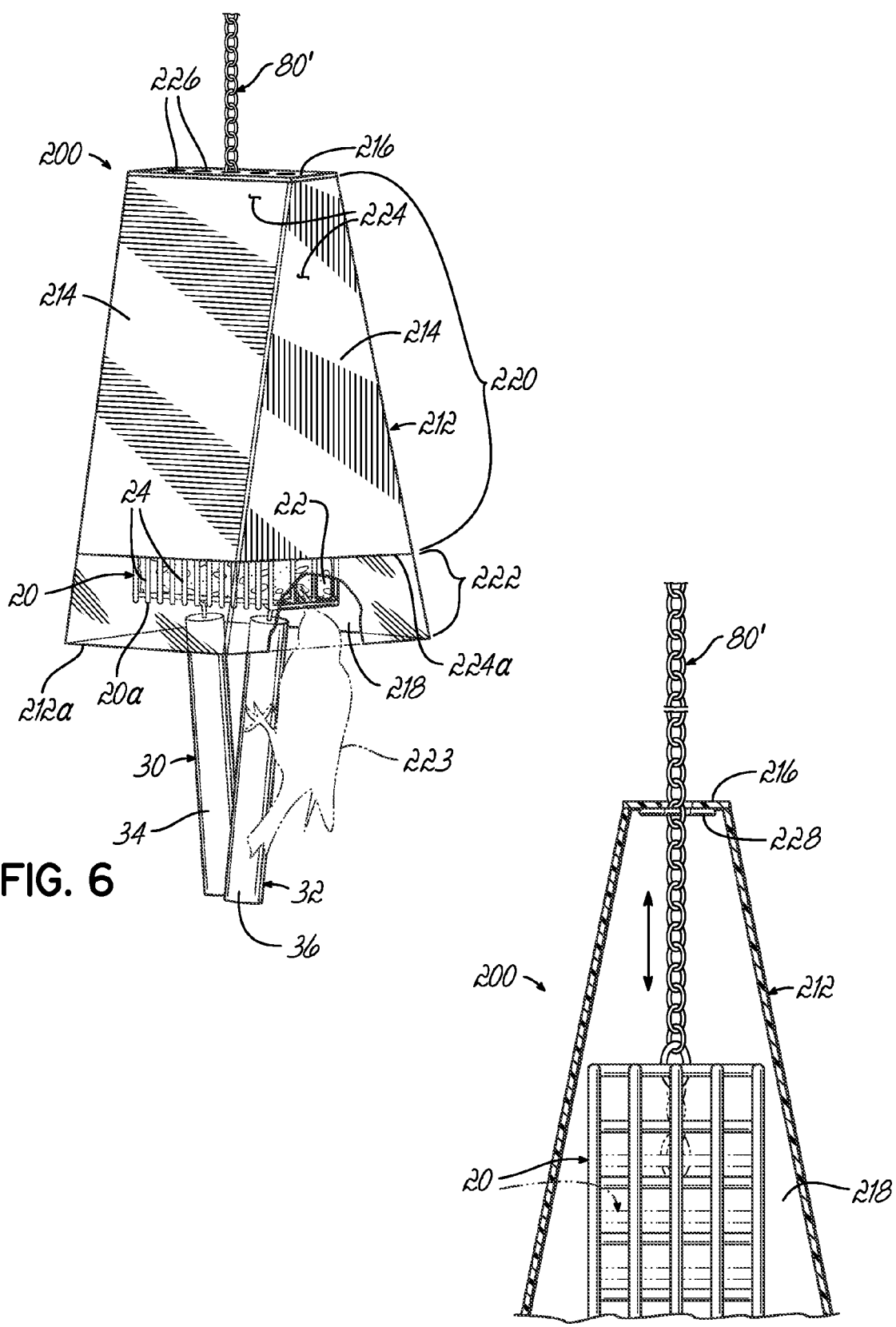

BIRD FEEDER

CROSS REFERENCES

This application claims the benefit of U.S. Provisional Patent Application Ser. No. 60/747,713, filed on May 19, 2006, the disclosure of which is hereby incorporated by reference herein.

TECHNICAL FIELD

This invention generally relates to bird feeders, and more specifically, this invention relates to a bird feeder that permits clinging birds, such as woodpeckers, to enter and exit the bird feeder, while preventing entry of other birds and squirrels, for example.

BACKGROUND

Birdwatching is a pastime of increasing popularity in the United States and abroad. While an excursion into a wilderness area is one way to view birds, many people derive satisfaction by attracting birds to their own property through various feeding devices. However, the feed provided by these devices is also highly attractive to undesired species of birds, squirrels and other rodents. A chronic problem plaguing all such devices, therefore, is how to provide fresh feed to attract certain species of birds, while simultaneously preventing undesired species of birds, squirrels, and other rodents from also partaking of that feed, while maintaining visibility of desired birds. Accordingly, there is a need for a bird feeder that limits access to species of birds that access food by clinging, such as woodpeckers.

Most conventional bird feeders are insufficient in satisfying the needs of the avid clinging bird enthusiast. The ability to house a consolidated bird feed supply such as suet-seed cake is a necessity required for many bird enthusiasts. Also, the feeder has to be able to shield the feed from the elements, and discriminate against undesired species such as perching birds and squirrels, all while providing an unobstructed view to the nearby bird enthusiast.

Unlike conventional bird feeders that provide birds with loose bird feed, clinging birds typically require a suet-seed cake feed. This feed must be distributed with a method dissimilar to conventional feeders. For suet-seed to be used in a feeder there has to be an enclosure that will retain the feed while still allowing the desired species access to the feed through a cage enclosure. Furthermore, this enclosure needs to be easily emptied, cleaned, and refilled.

The outdoor environment is an aspect that can be detrimental to the condition of suet-seed feed. Since suet-cakes can contain animal fats that allow the feed to hold its shape, protection from the elements would be desirable. Failure to provide such protection can allow the feed to become rancid, and undesirable to birds. Over time the spoiling and wasting of exposed suet-seed feed can be costly in terms of both time and expense.

One of the major areas where conventional bird feeders are deficient is in effectively discriminating against undesired species of animals while providing an unobstructed view to the nearby bird enthusiast. Currently available feeders often dispense food on some type of platform. Traditional flatbed feeders are preferable from the standpoint of being able to view all of the birds presently at the feeder. But the ability of such feeders to prevent undesirable species such as perching birds and squirrels from feeding on the same feed is minimal or non-existent, as they provide a ready platform from which a squirrel can access the feed. Another embodiment of conventional bird feeders is an enclosed feeder. While these feeders may be effective in deterring squirrels, it is not sufficiently effective in reducing the squirrel's access to the feed. Furthermore, since the feeder is enclosed it may hinder some desired birds from gaining access to the feeder due to size restrictions imposed by the entrance and egress openings of the feeder. Also, the nature of the enclosed feeder does not provide bird watchers the opportunity to partake in viewing the birds while they feed.

The challenges suggested in the preceding are not intended to be exhaustive but rather are among many which tend to reduce the usefulness of conventional clinging bird feeders. Other noteworthy problems may also exist; however, those presented above should clearly demonstrate that such feeders appearing in the past need worthwhile improvement.

SUMMARY OF THE INVENTION

In one embodiment, the present invention provides a bird feeder for feeding clinging birds. The bird feeder comprises a transparent housing having at least one side wall surrounding an interior space. A feeding element is configured to hold food for the clinging birds and has an exterior enclosing the food. The exterior includes openings for allowing access to the food by the clinging birds. The feeding element is enclosed within the interior space of the transparent housing. A first elongate clinging element extends downwardly from the feeding element and is configured to allow the clinging birds to climb upward to the feeding element while preventing perching birds or other animals access to the feeding element. A heat shield may be mounted above the transparent housing and above the feeding element. The heat shield is configured to provide shade to the feeding element and reduce heat transfer to the food. A suspension element is connected to the feeding element and extends upwardly through the transparent housing and the heat shield, if present, for allowing the housing, heat shield, feeding element and first elongate clinging element to be suspended from any suitable support.

The heat shield may include an upper surface that is reflective of radiation so as to reduce heat transfer to the interior space. For example, the upper surface may be coated or otherwise formed or polished to have a mirror finish. A second elongate clinging element may extend downwardly from the feeding element to allow multiple clinging birds to climb upwardly to the feeding element. The feeding element may further comprise a wire basket that is configured to hold a suet cake. The heat shield may include upper ventilation openings and may also include a plurality of side panels angled downwardly from the upper portion of the heat shield so as to provide ventilation openings between adjacent side panels. The elongate clinging element(s) may further comprise rods formed from wood. The transparent housing may also or alternatively include an upper portion with a plurality of ventilation openings.

To provide further assurance that only clinging birds can have access to the feeding element, the lower edge of the feeding element may be positioned above the lower edge of the transparent housing. In addition, or alternatively, only narrow gaps are left between the feeding element and adjacent interior wall surfaces of the transparent housing such that only clinging birds of a desired maximum size can enter the transparent housing and access food in the feeding element.

In another embodiment of the invention, a bird feeder is provided comprising a feeding element configured to hold food for the birds and having an exterior enclosing the food.

The exterior includes openings for allowing access to the food by the birds. A heat shield is mounted above the feeding element and is configured to provide shade to the feeding element and reduce heat transfer to the food. A suspension element connects to the feeding element and extends upwardly through the heat shield for allowing the feeding element and the heat shield to be suspended from any suitable support. Any or all of the secondary features discussed herein may alternatively or in addition be added to this embodiment of the invention.

In another embodiment of this invention, the housing serves as a heat shield to protect the food from sunlight and any other radiant heat, as well as performing its other functions as described in the previous embodiments. To this end, an upper portion of the housing is reflective of sunlight, while the lower portion, where desirable clinging type birds will feed, is transparent so that the view of the birds is not obstructed.

Another embodiment using the aspects of this invention is a heat shield for suspending over food in a birdfeeder configured to provide shade to reduce heat transfer to the food. The heat shield has an upper portion and a plurality of side panels angled downwardly from the upper portion.

Another embodiment using aspects of this invention is a method of excluding undesired perching birds and animals from feeding on food at the bottom of a suspended container such as a cage, while not excluding desirable clinging species of birds from feeding on the food. The method includes positioning a wooden dowel below the bottom of the food, so that a clinging bird can land and cling to the dowel, but non-clinging species have no place to perch.

Various additional aspects, features and advantages of the invention will become more apparent to those of ordinary skill in the art.

BRIEF DESCRIPTION OF THE DRAWINGS

The accompanying drawings, which are incorporated in and constitute a part of this specification, illustrate embodiments of the invention and, together with the general description of the invention given above and the detailed description of the embodiments given below, serve to explain the principles of the present invention.

FIG. 6 is an assembled perspective view of a bird feeder of FIG. 5 showing a bird feeding within the transparent portion.

FIG. 7 is an elevation breakaway view showing the adjustment pin of the bird feeder of FIG. 5.

DETAILED DESCRIPTION OF THE ILLUSTRATIVE EMBODIMENTS

Figure 1:
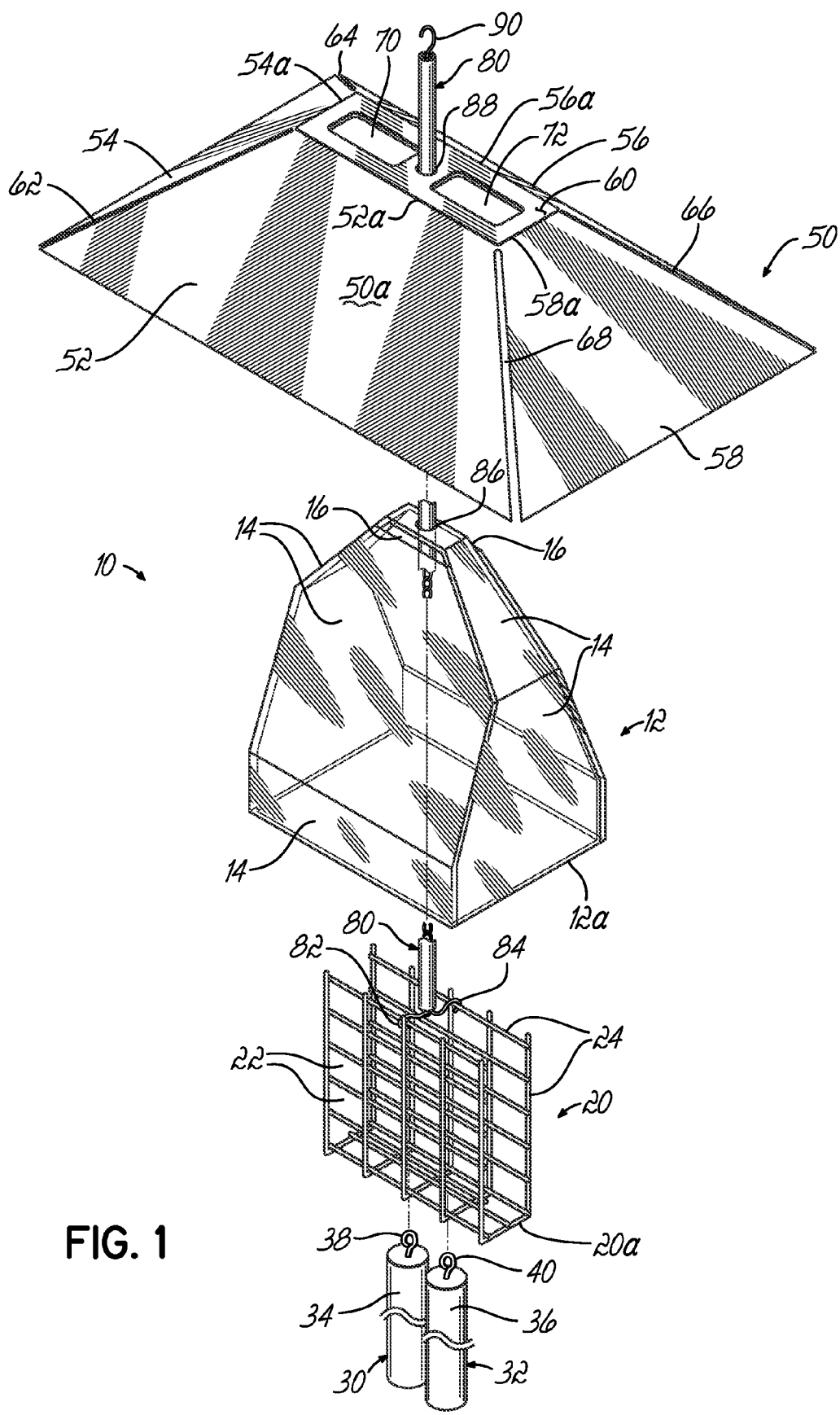
FIG. 1 is an exploded perspective view of a bird feeder embodying the invention.

It will be appreciated that like reference numerals throughout the various drawing figures refer to like elements of structure. Structure with like reference numerals having prime (') or double prime (") marks refers to structure that has been slightly modified from the previously described structure having the same numerical designation, as will be described. Reference will first be made generally to FIGS. 1, 1A, 2, 2A and 2B. As shown in FIGS., 1, 2 and 2A, a bird feeder 10 is shown including a transparent housing 12 having a plurality of side walls 14 surrounding an interior space. The housing 12 may be formed of a plastic and may include ventilation openings 16 at an upper end thereof and/or in other locations (not shown). It will be appreciated that the transparent housing 12 may have any other shape than the shape shown, however, the shape shown has certain advantages as will become apparent. A feeding element 20, in the exemplary form of a wire cage or basket, is configured to hold food (not shown), such as a suet cake, for clinging birds. The feeding element 20 includes an exterior (which, in the embodiment shown is a wire mesh) for enclosing the food with the exterior having openings 22 for allowing access to the food by the clinging birds. In this embodiment, the openings 22 are provided between the wires 24 of the cage or basket 20. The feeding element 20 is enclosed within the interior space of the transparent housing 12.

Preferably, the lower edge 20a of the feeding element 20 is positioned above the lower edge 12a of the transparent housing 12. In addition, only narrow gaps are left between the interior side wall surfaces of the transparent housing 12 and the side faces and ends of the feeding element 20. These narrow gaps may be various widths depending on the design of the bird feeder and the size of the birds that are meant to access the food. Presently, it is preferred that the gaps be no more than about 1.5 inches in width. This helps ensure that only the appropriately sized clinging birds can climb upwardly between the transparent housing 12 and the feeding element 20 to access the food. Larger perching birds or other animals will not be able to access the feeding element 20 as a result. First and second elongate clinging elements 30, 32 extend downwardly from the feeding element 20. These clinging elements 30, 32 are preferably wooden dowel rods 34, 36 that hang with appropriate hook elements 38, 40 from the lower portion of the wire cage or basket 20.

Figure 1A:
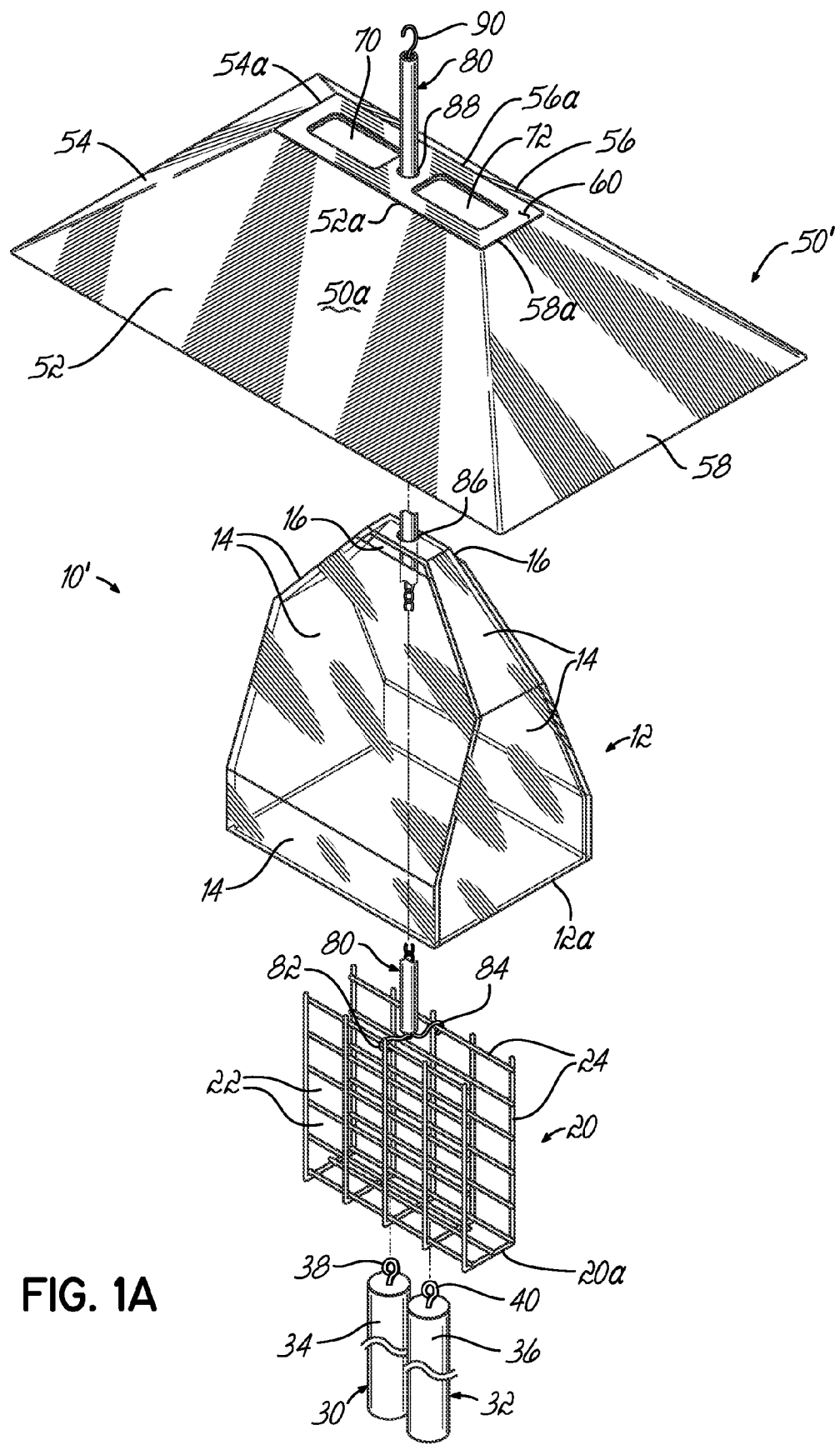
FIG. 1A is an exploded perspective view of the bird feeder of FIG. 1, but illustrating an alternative embodiment of the heat shield associated therewith.
Figure 2:
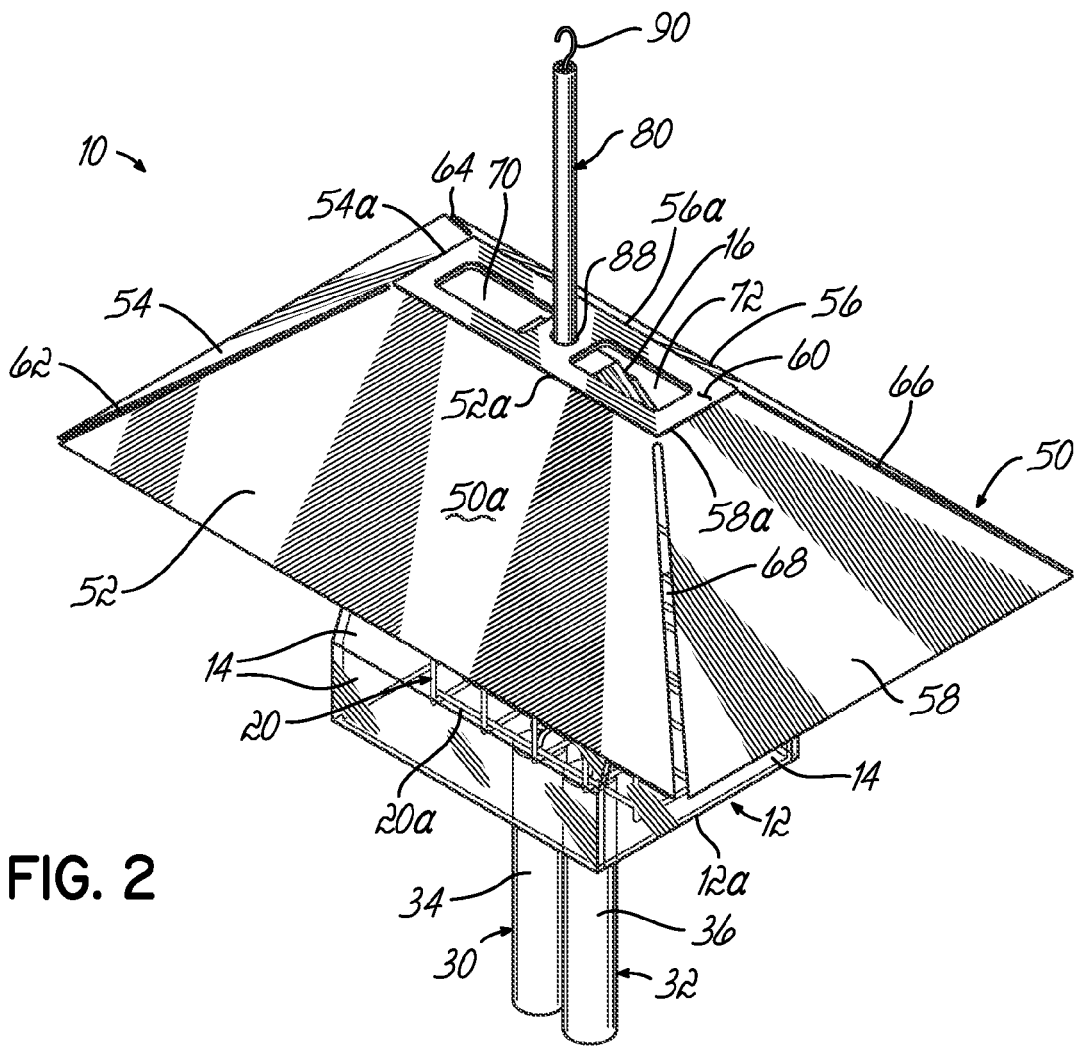
FIG. 2 is an assembled perspective view of the embodiment shown in FIG. 1.
Figure 2A:
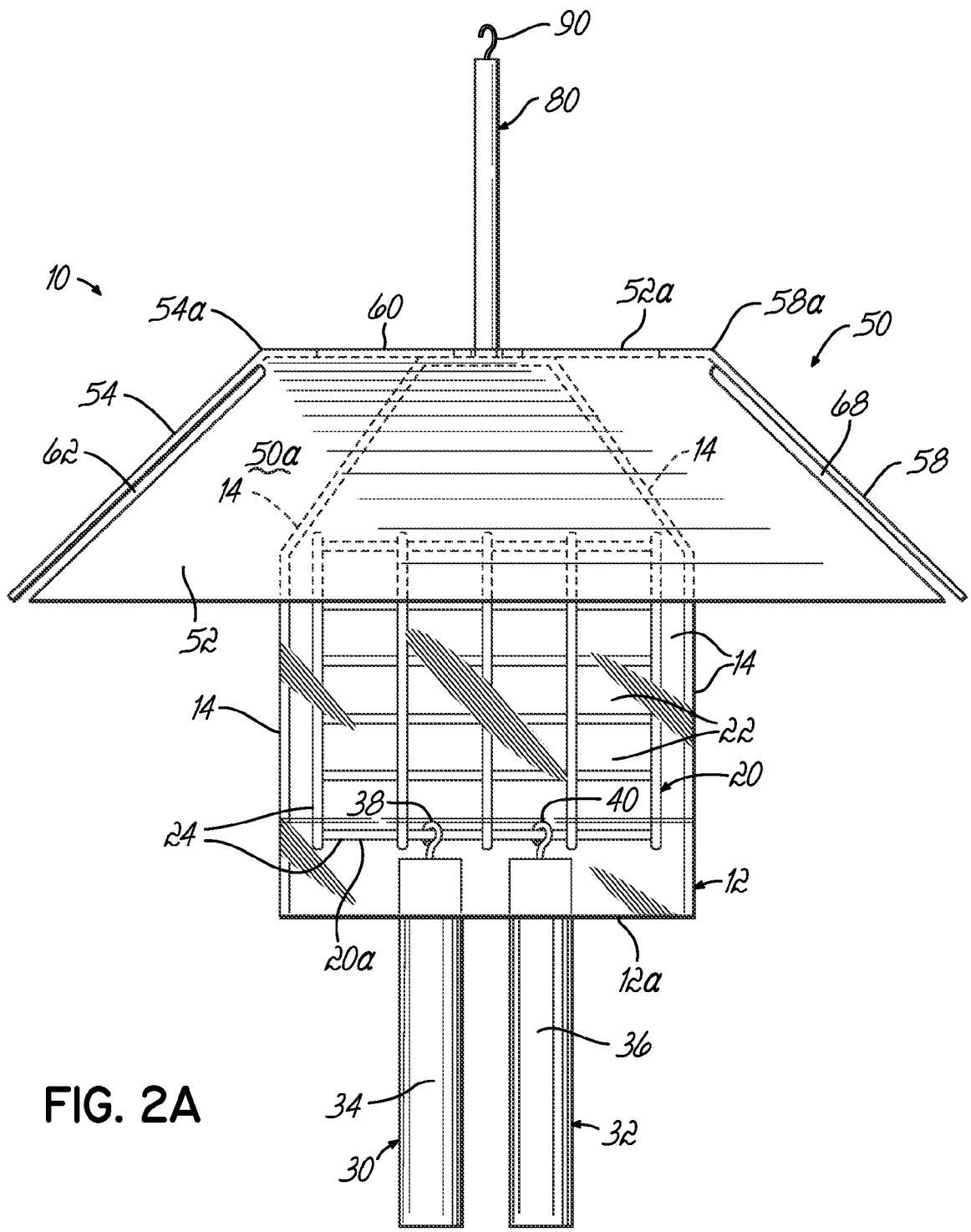
FIG. 2A is a front elevational view of the embodiment shown in FIG. 2.
Figure 2B:
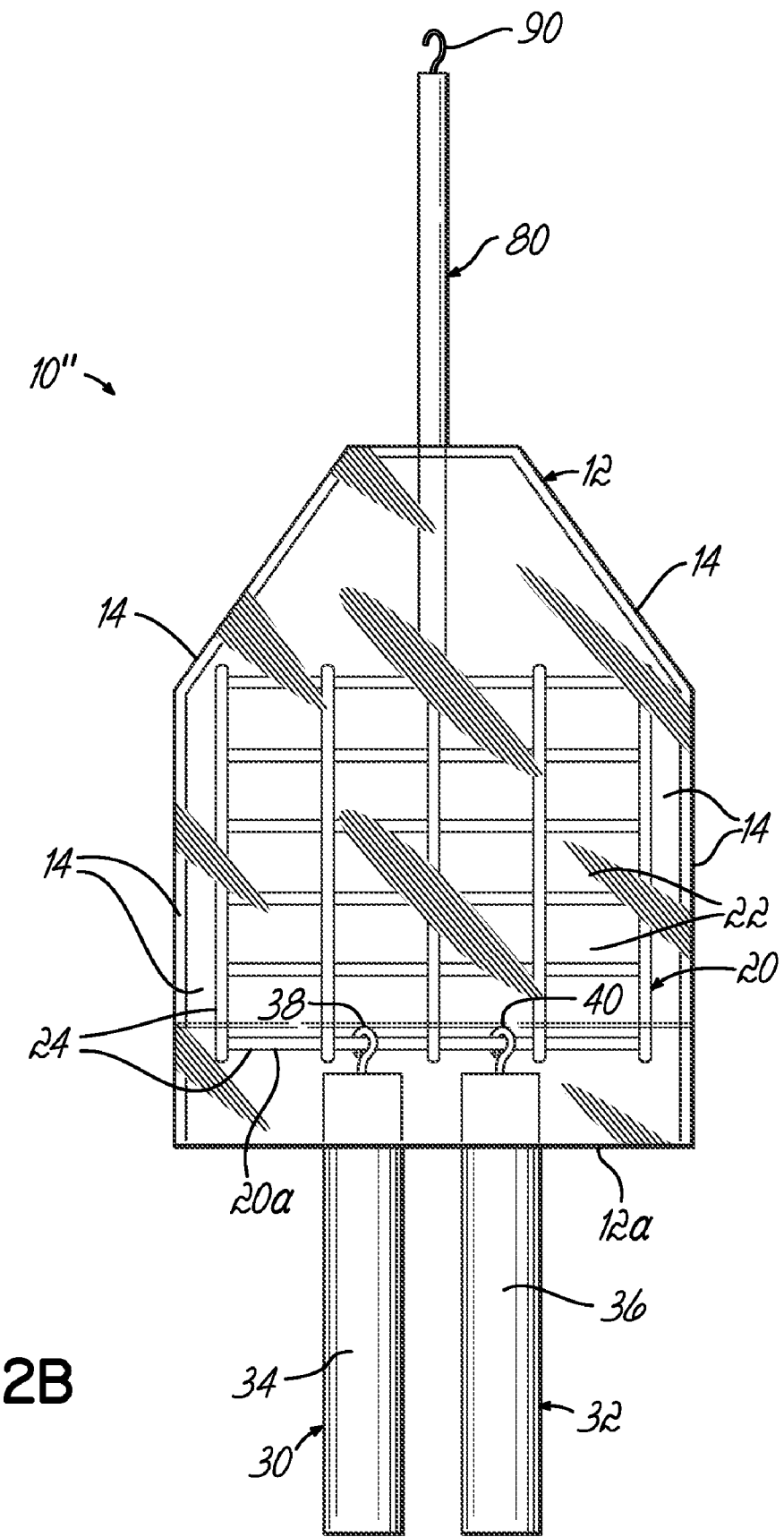
FIG. 2B is a front elevation view similar to FIG. 2A, but illustrating the bird feeder without the use of the heat shield.

A heat shield 50 is mounted above the transparent housing 12 and above the feeding element 20. The heat shield 50 is configured to provide shade to the feeding element 20 and reduce heat transfer to the food, such as the suet cake (not shown) held within the wire cage or basket 20. The heat shield 50 may have an upper surface 50a that is polished or otherwise formed or coating to have a reflective finish, such as a mirrored finish or a white or other light colored finish. The heat shield 50 may be formed of plastic with respective side panels 52, 54, 56, 58 that are bent downwardly from an upper panel 60 at respective fold lines 52a, 54a, 56a, 58a, such as during a thermoforming or bending process, such that gaps 62, 64, 66, 68 are formed between adjacent side panels 52, 54, 56, 58. The gaps 62, 64, 66, 68 provide additional ventilation openings. The combination of a reflective finish, as mentioned above, and ventilation openings helps ensure that the temperature of the suet-seed cake does not elevate above ambient temperature. This therefore helps prevent the suet-seed cake from melting since ambient temperature is seldom hot enough to melt the suet-seed cake. FIG. 1A illustrates the bird feeder with a heat shield 50' that has been modified to eliminate the gaps 62-68. Still further ventilation openings 70, 72 may be provided in the upper panel 60. A suspension element 80 is connected to the feeding element 20, such as by appropriate hooks 82, 84, and extends upwardly through respective apertures 86, 88 in the transparent housing 12 and the heat shield 50. A hook 90 or other element is provided at the upper end of the suspension element 80 for allowing the housing 12, feeding element 20, heat shield 50 and elongate clinging elements 30, 32 to be suspended from any suitable support. As is known in the art, such supports may be poles, trees, awnings, other structures associated with houses or buildings, or any other supports. In locations that are completely or primarily shaded, it may not be necessary to include heat shield 50 or 50'. Thus, the heat shield 50 or 50' may be eliminated as shown in FIG. 2B providing even better visibility of the feeding birds to the bird watcher.

Figure 3:
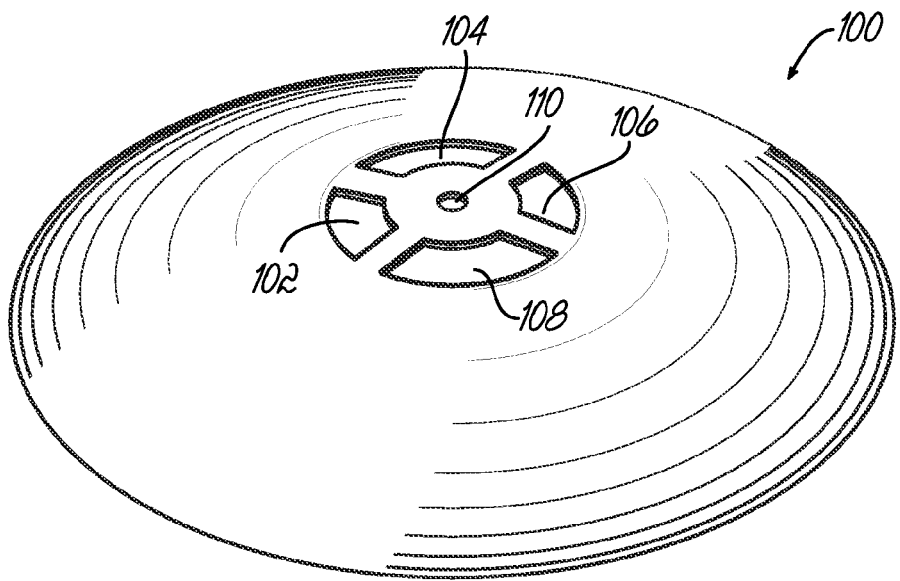
FIG. 3 is a perspective view of another embodiment of a heat shield that may be incorporated into the embodiment of FIG. 1.

FIG. 3 illustrates one of many other possible embodiments for a heat shield 100. In this embodiment, the heat shield 100 is circular and generally concave, and includes ventilation openings 102, 104, 106, 108, as well as a central opening 110 for a suspension element 80, such as suspension element from the first embodiment described above.

Figure 4:
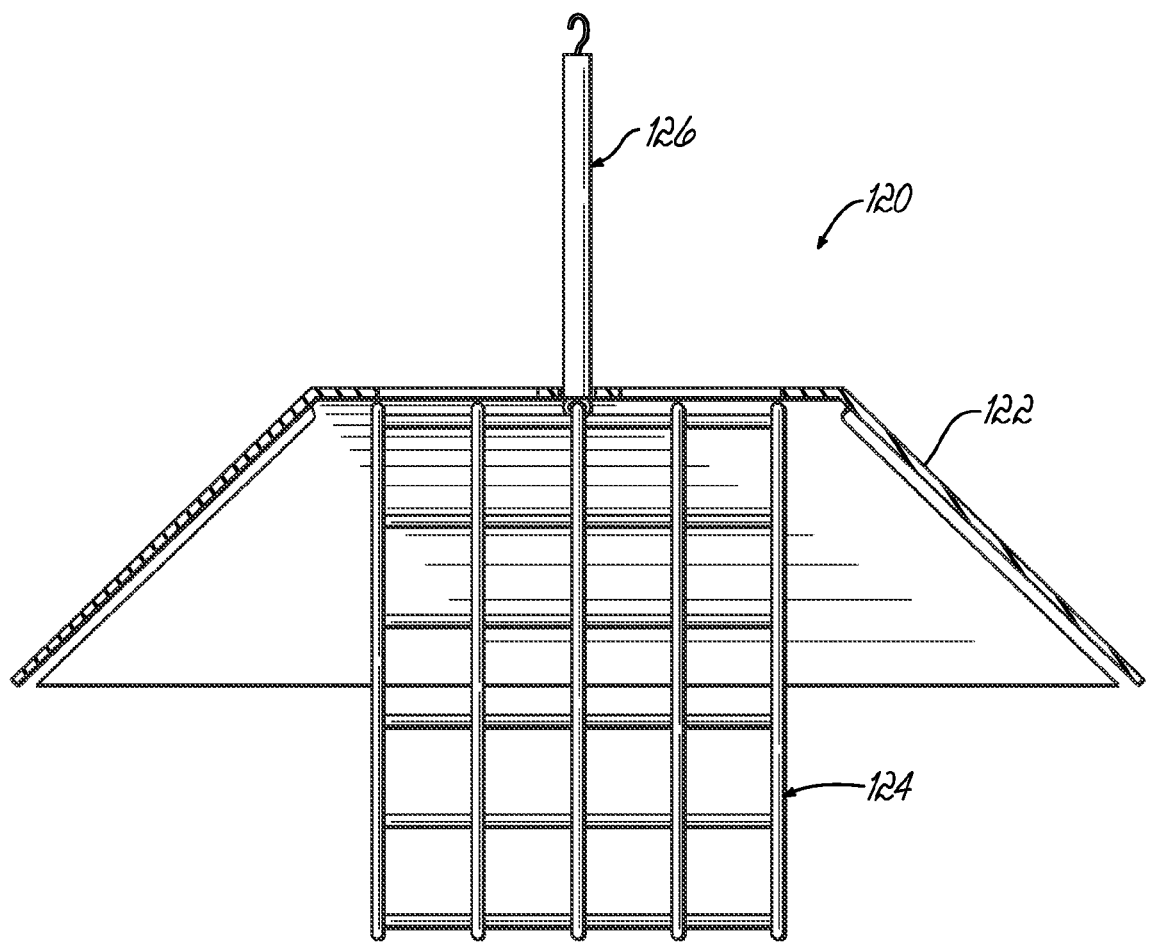
FIG. 4 is a cross sectional view of another embodiment of the invention.

FIG. 4 illustrates another embodiment of a bird feeder 120 that essentially comprises a heat shield 122 and a feeding element 124 that may be constructed generally as described above. A suspension element 126 is also provided as generally described above. The bird feeder 120 of FIG. 4 would be suitable for feeding all types of birds and would not be limited to access by only clinging birds as is the first embodiment.

Figure 5:
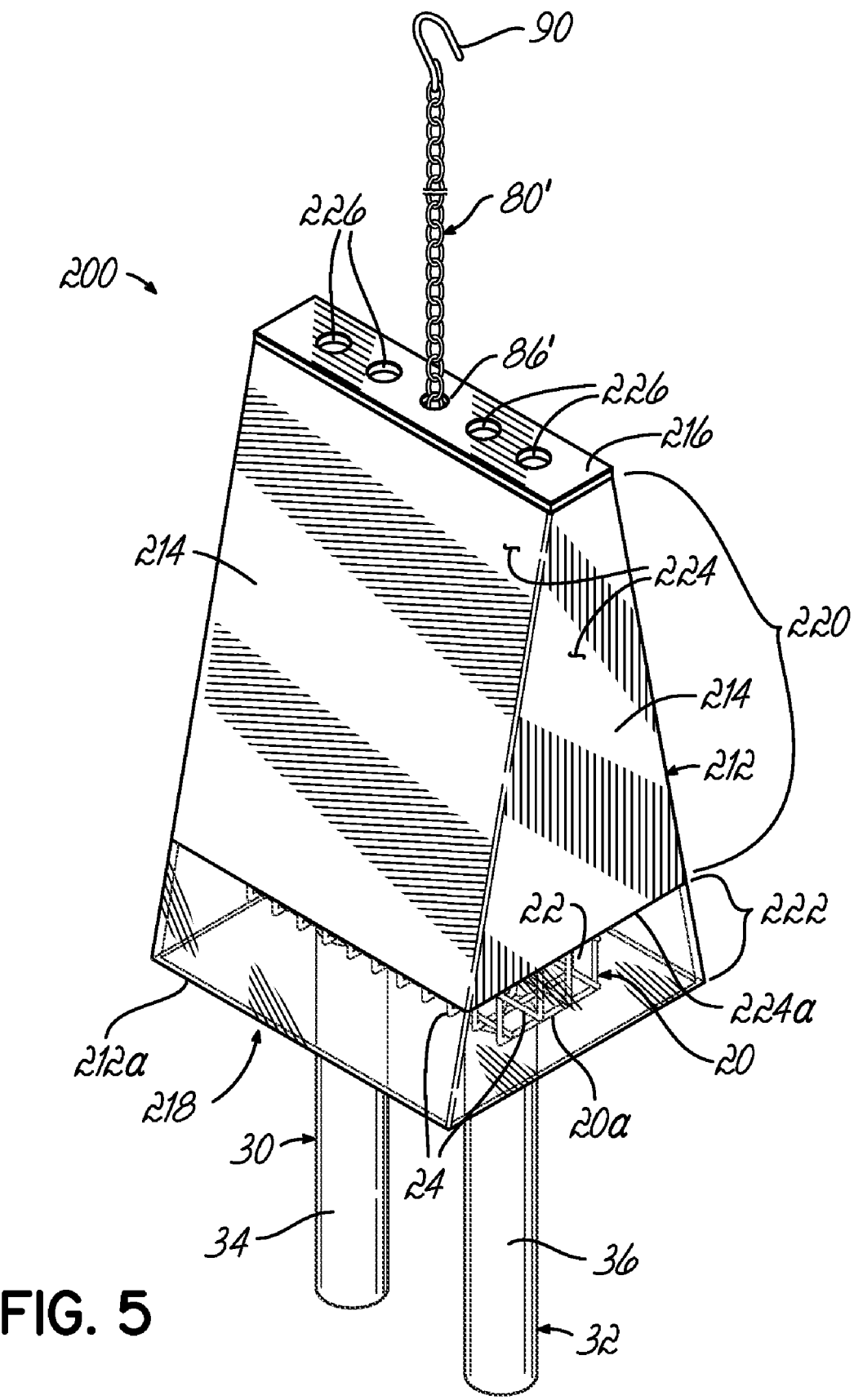
FIG. 5 is an assembled perspective view of a bird feeder embodying another embodiment of the invention.

FIG. 5 illustrates another bird feeder 200 embodying this invention. In this embodiment, the housing serves as a heat shield to protect the food from sunlight and any other radiant heat, as well as performing its other functions as described in the previous embodiments. To this end, an upper portion of the housing is reflective of sunlight, while the lower portion, where desirable clinging type birds will feed, is transparent so that the view of the birds is not obstructed. A housing 212 is shown having four side walls 214 and a top 216 and a lower edge 212a surrounding an interior space 218. The housing 212 has an upper portion 220, including top 216, which reflects sunlight and shades the food (not shown) to reduce the heat input to the food. The housing also includes a lower portion 222 that is transparent to allow a person to see through it into the interior space 218. The housing is made of a clear plastic material that has a reflective coating 224, such as white, on the exterior surface of the upper portion 220. The coating has a lower edge 224a that defines the boundary between the upper portion and the lower portion. This coating lower edge 224a is located approximately 1 to 2 inches from the housing lower edge 212a. The top 216 has ventilation openings 226, although these openings could also be located in the upper area of the walls 214.

A feeding element 20, in the exemplary form of a wire cage or basket, is configured to hold food (shown in FIG. 6), such as a suet cake, for clinging birds. The feeding element 20 includes an exterior (which, in the embodiment shown is a wire mesh) for enclosing the food with the exterior having openings 22 for allowing access to the food by the clinging birds. In this embodiment, the openings 22 are provided between the wires 24 of the cage or basket 20. The feeding element 20 is enclosed within the interior space 218 of the housing 212.

Preferably, the lower edge 20a of the feeding element 20 is positioned flush or above the lower edge 212a of the housing 212. In addition, only narrow gaps, are left between the interior side wall surfaces of the housing 212 and the side faces and ends of the feeding element 20. These narrow gaps may be various widths depending on the design of the bird feeder and the size of the birds that are meant to access the food. Presently, it is preferred that the gaps be no more than about 1 inch in width. This helps ensure that only the appropriately sized clinging birds can climb upwardly between the housing 212 and the feeding element 20 to access the food. Larger perching birds or other animals will not be able to access the food as a result.

The structure described above is effective to exclude non clinging birds and animals from the sides of the feeding element 20, but the food at the bottom would be exposed to birds hovering below it or flying directly to the bottom of the wire cage and perching on it. To discourage these birds, first and second elongate clinging elements 30, 32 extend downwardly from the feeding element 20. These clinging elements 30, 32 are preferably wooden dowel rods 34, 36 that hang with appropriate hook elements 38, 40 from the lower portion of the wire cage or basket 20. These clinging elements are a flight obstruction for birds attempting to hover below the food or to fly directly to the bottom of the cage. However, clinging birds can land on the elongate clinging elements, and climb upwards to fit their head in the space between the housing 212 and the feeding element 20 as seen in FIG. 6, or to eat from the bottom of the food in the food element. It can also be seen that the clinging bird can be fully viewed while feeding, since most of the bird remains outside of the housing 212, and the other portion is viewable through the transparent lower portion 222.

FIG. 5 additionally illustrates that a suspension element 80', for example a chain, is connected to the feeding element 20. This chain can be permanently attached, or attached by appropriate hooks such as 82 and 84 (FIG. 1). The suspension element extends upwardly through aperture 86' in top 216 in the housing 212 which is slideable along the chain. A hook 90 or other element is provided at the upper end of the suspension element 80' for allowing the housing 212, feeding element 20, and elongate clinging elements 30, 32 to be suspended from any suitable support. As is known in the art, such supports may be poles, trees, awnings, or other structures associated with houses, or buildings, or any other supports. The hook 90 can be detachable from the suspension element 80', if necessary, to allow threading through the aperture 86'.

FIG. 6 illustrates the embodiment of FIG. 5 in use. A bird 223 is feeding on the bottom of the suet cake in the feeding basket. It can be seen that a portion of the clinging bird is visible below the housing 212, and a portion is visible through the housing lower portion 222 because the lower portion is transparent. The housing upper portion 220, having a reflective coating or otherwise formed to be reflective of radiation from the sun, is shading the suet cake from the heat of the sunlight that may be shining on the birdfeeder. Again, this aspect in combination with ventilation openings helps prevent the suet-seed cake from melting as previously discussed. The basket lower edge 20a is above the housing lower edge 212a, and below the coating lower edge 224a. The coating edge is also the defining line that separates the upper portion 220 from the lower portion 222.

FIG. 7 further illustrates the embodiment of FIGS. 5 and 6. Housing 212 which is able to slide along chain 80' is shown held against an adjustable stop member 228 by the force of gravity acting on the housing 212. The stop member, for example a cotter pin or a rod, is located at a position on the chain 80' to vertically position the housing 212 relative to the feeding element 20, and more specifically the lower edge 212a relative to the feeding element lower edge 20a, as shown in FIG. 6. A similar stop member (not shown) could be placed on the top surface of housing 212 if a particularly lightweight housing embodiment, susceptible to upward forces such as by wind or animals, is used.

While the present invention has been illustrated by a description of various preferred embodiments and while these embodiments have been described in some detail, it is not the intention of the Applicant to restrict or in any way limit the scope of the appended claims to such detail.

Additional advantages and modifications will readily appear to those skilled in the art. For instance, although the embodiments described for the heat shields and housing have been of one-piece construction, and have in some cases used coatings, instead multiple materials could be used and attached together. Or, a plastic molding process, involving two dissimilar materials or colors may also be used. Another example would be that although these elongate clinging elements were hung from the bottom of the feeding element, other suitable positioning methods are possible, such as adding a bracket across the bottom of the housing, and attaching the clinging elements to it. Another variant of this invention would be to place the coating 224 on the interior surface of the transparent housing material, either instead of, or in addition to, placing it on the exterior surface.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. The various features discussed herein may be used alone or in any combination depending on the needs and preferences of the user. This has been a description of illustrative aspects and embodiments the present invention, along with the preferred methods of practicing the present invention as currently known. However, the invention itself should only be defined by the appended claims.

What is claimed is:

1. A bird feeder for feeding clinging birds, comprising:
   a housing including at least one side wall surrounding an interior space, at least a portion of said housing being transparent,
   a feeding element configured to hold food for the clinging birds and having an exterior enclosing the food, said exterior having openings for allowing access to the food by the clinging birds, said feeding element being enclosed within said interior space of said housing;
   a first elongate clinging element extending downwardly from said feeding element and configured to allow the clinging birds to climb upward to said feeding element while preventing perching birds or animals access to said feeding element;
   a suspension element connected to said feeding element and extending upwardly through said housing for allowing said housing, feeding element and first elongate clinging element to be suspended from a support; and
   a second elongate clinging element extending downwardly from said feeding element and configured to allow the clinging birds to climb upward to said feeding element while preventing perching birds or animals access to said feeding element.

2. The bird feeder of claim 1, wherein said feeding element further comprises a wire basket configured to hold a suet cake.

3. The bird feeder of claim 1, wherein said first elongate clinging element further comprises a rod formed from wood.

4. The bird feeder of claim 1, wherein said housing includes an upper portion with a plurality of ventilation openings.

5. A bird feeder for feeding clinging birds, comprising:
   a housing including at least one side wall surrounding an interior space, at least a portion of said housing being transparent,
   a feeding element configured to hold food for the clinging birds and having an exterior enclosing the food, said exterior having openings for allowing access to the food by the clinging birds, said feeding element being enclosed within said interior space of said housing;
   a first elongate clinging element extending downwardly from said feeding element and configured to allow the clinging birds to climb upward to said feeding element while preventing perching birds or animals access to said feeding element;
   a suspension element connected to said feeding element and extending upwardly through said housing for allowing said housing, feeding element and first elongate clinging element to be suspended from a support; and
   a heat shield mounted above said housing and said feeding element and configured to provide shade to said feeding element and reduce heat transfer to the food, said suspension element extending upwardly through said heat shield, wherein said housing and said heat shield are slidable along said suspension element.

6. The bird feeder of claim 5, wherein said heat shield includes an upper portion and a plurality of side panels angled downwardly from said upper portion, and further comprising ventilation openings between adjacent side panels.

7. The bird feeder of claim 5, wherein said heat shield includes an upper surface, said upper surface being reflective of radiation so as to reduce heat transfer to said interior space.

8. The bird feeder of claim 5, wherein said heat shield includes an upper portion and said upper portion includes a plurality of ventilation openings.

9. A bird feeder for feeding clinging birds, comprising:
   a housing including at least one side wall surrounding an interior space, at least a portion of said housing being transparent,
   a feeding element configured to hold food for the clinging birds and having an exterior enclosing the food, said exterior having openings for allowing access to the food by the clinging birds, said feeding element being enclosed within said interior space of said housing;
   a first elongate clinging element extending downwardly from said feeding element and configured to allow the clinging birds to climb upward to said feeding element while preventing perching birds or animals access to said feeding element; and
   a suspension element connected to said feeding element and extending upwardly through said housing for allowing said housing, feeding element and first elongate clinging element to be suspended from a support;
   wherein the housing further comprises a reflective coating configured to provide shade to said feeding element and reduce heat transfer to the food, and a transparent portion positioned to allow viewing of the clinging birds eating the food.

10. The bird feeder of claim 9, wherein said housing includes an upper portion and said upper portion includes a plurality of ventilation openings.

11. The bird feeder of claim 9, further comprising a stop member to vertically position said housing in relation to said feeding element, and wherein said housing is slidable along said suspension element and held against said stop member.

12. The bird feeder of claim 9, wherein said reflective coating is white.

13. A method of assembling a bird feeder permitting desirable clinging species of birds to feed on food in the bird feeder, while excluding undesired perching birds and animals from feeding on the food, comprising:

suspending a feeding element with the food in a housing having at least one transparent portion allowing viewing of the clinging species of birds, by extending a suspension element from the feeding element through the housing, suspending at least one wooden dowel rod downwardly relative to the feeding element, adjustably setting a position of the feeding element in the housing using a stop member on the suspension element; and removably coupling a heat shield member to the suspension element such that the heat shield member is positioned above the housing to shield the food from sunlight.

14. A method of assembling a bird feeder permitting desirable clinging species of birds to feed on food in the bird feeder, while excluding undesired perching birds and animals from feeding on the food, comprising:

suspending a feeding element with the food in a housing having at least one transparent portion allowing viewing of the clinging species of birds, by extending a suspension element from the feeding element through the housing, suspending at least one wooden dowel rod downwardly relative to the feeding element, adjustably setting a position of the feeding element in the housing using a stop member on the suspension element; and wherein the feeding element further comprises a cage, and suspending the wooden dowel rod further comprises hooking the dowel rod to the cage.

* * * * *